F. TOMASEK.
AUTOMOBILE BUMPER.
APPLICATION FILED JULY 5, 1921.
1,396,944.
Patented Nov. 15, 1921.
2 SHEETS—SHEET 1.
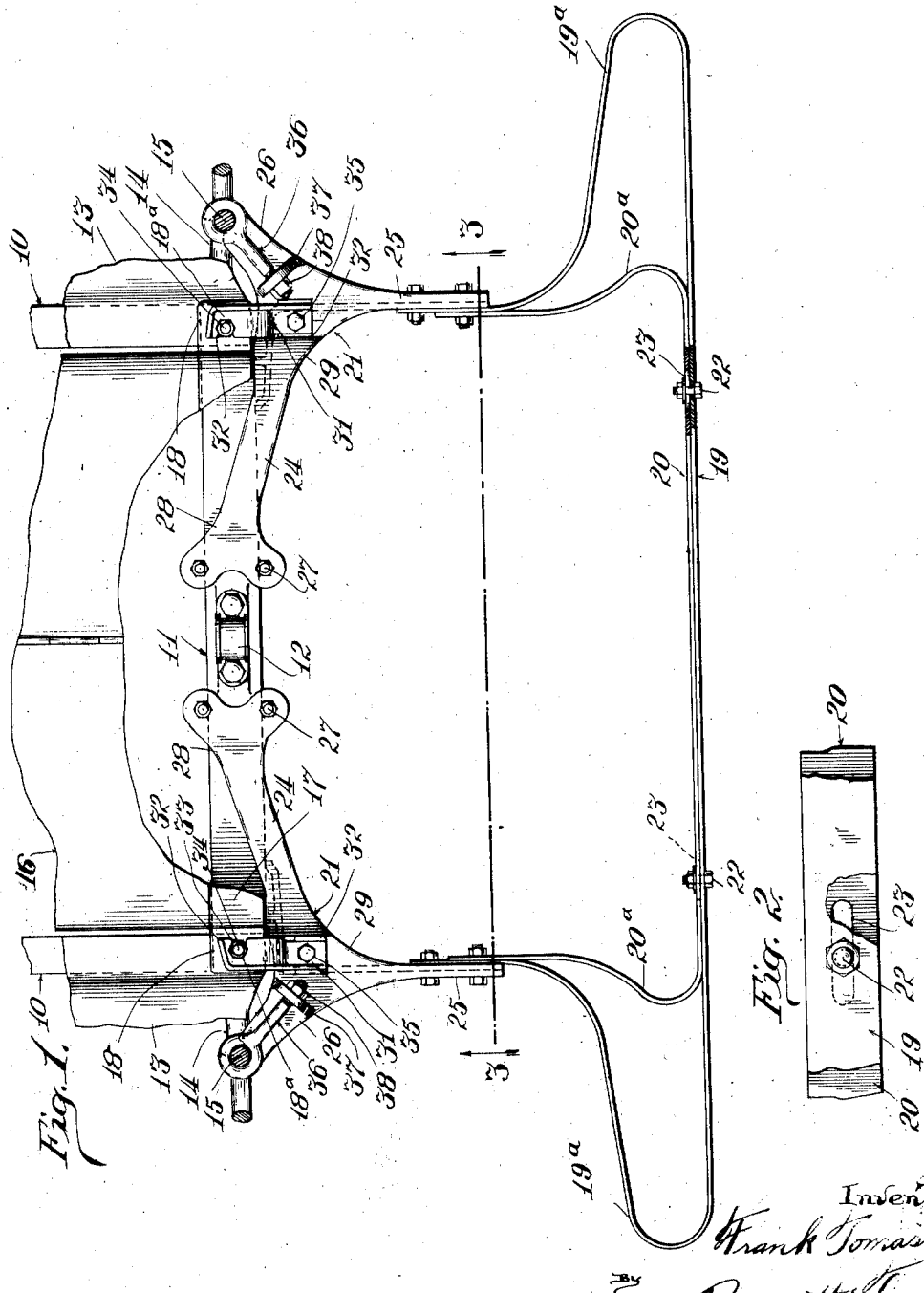
Inventor.
Frank Tomasek
By
Barnett Truman
Attorneys

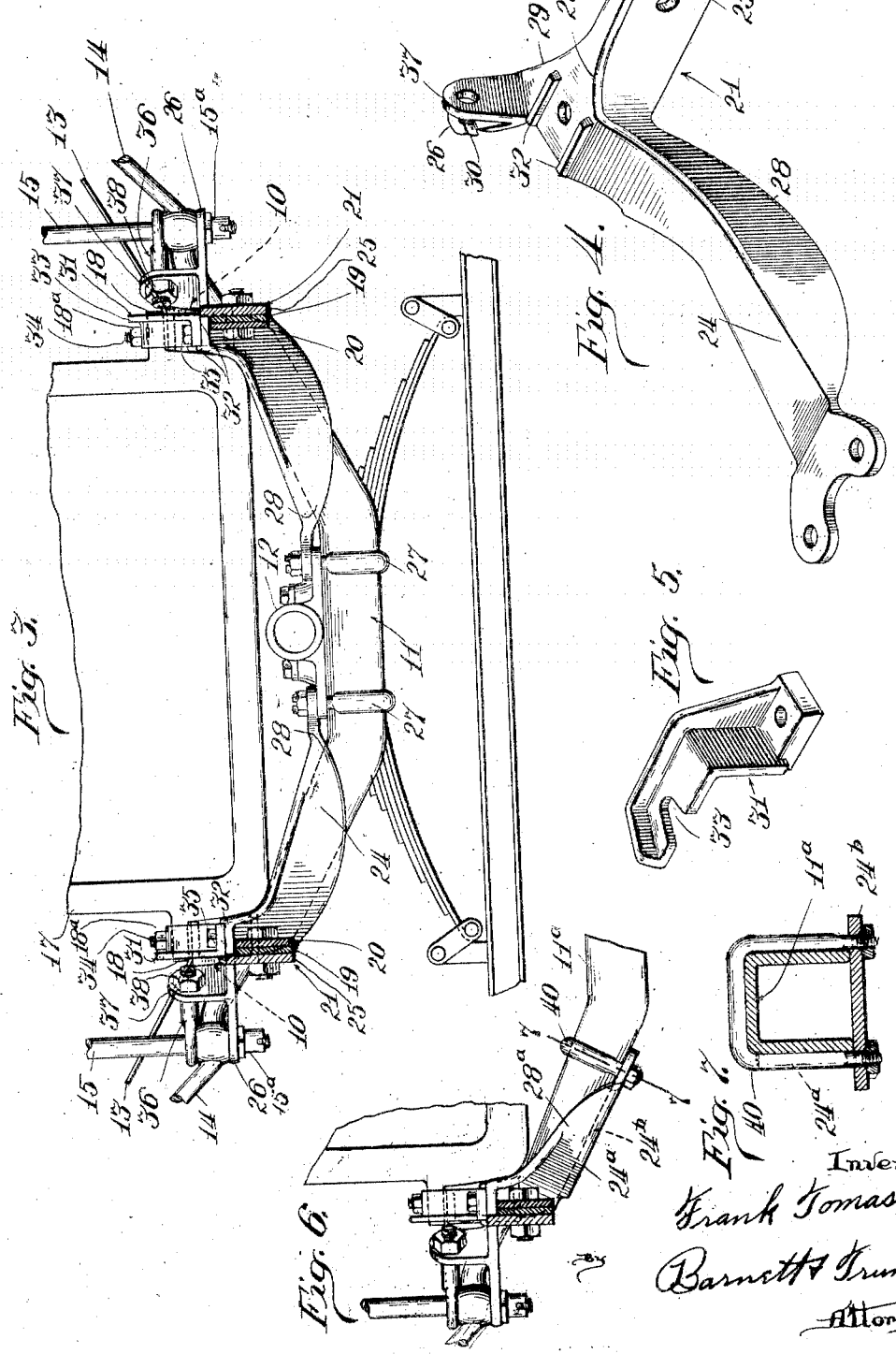

UNITED STATES PATENT OFFICE.

FRANK TOMASEK, OF CHICAGO, ILLINOIS.

AUTOMOBILE-BUMPER.

1,396,944.  Specification of Letters Patent.  Patented Nov. 15, 1921.

Application filed July 5, 1921. Serial No. 482,423.

*To all whom it may concern:*

Be it known that I, FRANK TOMASEK, a citizen of the United States, residing at Chicago, in the county of Cook and State of Illinois, have invented certain new and useful Improvements in Automobile-Bumpers, of which the following is a specification.

My invention relates to bumpers for automobiles, and has for its principal object the provision of a new and improved bumper construction which may be firmly attached to the framing of an automobile, so as to provide the desired rigidity to withstand the severe shocks and strains to which bumpers of this character are subjected. In this connection the invention contemplates a simple and inexpensive structure that may be firmly secured to the framing or other rigid parts of an automobile without requiring the removal of any of the parts of the automobile associated with the motor mechanism, whereby the bumper may be easily and quickly applied to or removed from its operative position by persons having no mechanical skill, without danger of such unskilfulness resulting in damage or disadjustment of the parts of the automombile with which the bumper is connected.

Another object of the invention is to provide a bumper which may be firmly attached to the more readily accessible portions of the framing or other rigid members of a "Ford type" of automobile, which will permit the various removable parts of the automobile, for example, the radiator, etc., to be subsequently detached and removed from the framing without disturbing the position of the bumper.

Another object is to provide an automobile bumper comprising two bumper bars of novel construction which may be rigidly connected at their extremities to the automobile, and are connected to each other intermediate their extremities with a connection that will minimize rattle of the bars and which at the same time will permit relative movement of the bumper bars when one or both of them are subjected to distortion or compression.

The invention has for further objects the novel constructions, arrangements and combinations of parts, and devices, hereinafter described and claimed, for carrying out the above stated objects and such other objects as will appear from the following description of the invention.

The invention is illustrated in certain preferred embodiments in the accompanying drawings, wherein—

Figure 1 is a fragmentary view in plan of the front end of a motor vehicle of the "Ford" type, showing a bumper constructed in accordance with my invention, applied in its operative position on said vehicle, a portion of the radiator, hood, and mudguards being broken away so as to illustrate more clearly the means provided for attaching the bumper to the framing of the vehicle.

Fig. 2 is a view in elevation showing a portion of the front faces of the bumper bars.

Fig. 3 is a fragmentary view, in elevation of the front end of a motor vehicle, illusarating the manner in which my improved bumper construction is attached to the framing of an automobile, this view being taken on line 3—3 of Fig. 1 looking in the direction indicated by the arrows.

Fig. 4 is a view in perspective of one of the bumper bar supporting brackets, with certain of the associated attaching members being removed therefrom.

Fig. 5 is a view in perspective of one of the members adapted to be used in connection with the bracket shown in Fig. 4, to effect an attachment of the bumper construction to the framing of the motor vehicle.

Fig. 6 is a fragmentary view in elevation, similar to that shown in Fig. 3, illustrating a modified construction of bumper bar support, and Fig. 7 is a view in cross-section taken on line 7—7 of Fig. 6, illustrating the manner in which the bumper bar supports shown in Fig. 6 are attached to the transverse body bolster of the automobile frame.

Like characters of reference designate like parts throughout the several figures of the drawings.

Referring first to Figs. 1 to 5 inclusive of the drawings, wherein I have shown one embodiment of my invention in a form suitable for use on "Ford" automobiles, it will be obvious that the various features herein disclosed might be used without departure from my invention in the construction of bumpers suitable for use on other types of automobiles, where similar conditions prevail.

In the drawings 10, 10 designate the side sills of a Ford chassis, 11 the front body bolster for supporting the front ends of the side sills, 12 the bearing for supporting the starting crank, 13, 13 the mud-guards, 14, 14 the supporting brackets for the mud-guards, 15, 15, the lamp supporting posts attached to the mud-guard supports, 16 the folding hood, 17 the radiator frame, and 18, 18 the flanges on the radiator frame adapted to be bolted to the side sills 10, 10 of the chassis.

My improved bumper construction may be described generally as consisting of two flat bumper bars 19 and 20 attached to the framing of the automobile, and adapted to extend across its front or rear end, so as to prevent damage to the automobile in the event of a collision with another automobile or other object.

The bumper bars are made preferably of spring metal, so as to yield when subjected to an impact, and are bent to the configuration shown in Fig. 1, with their extremities secured to the supporting members 21, 21, which members are so formed as to be attached to the automobile at points which are most accessible and which are at different planes, so as to firmly support the bumper bars in a horizontal position and prevent them from sagging or becoming loosened by vibration, and to resist the tendency of the bumper to be bent upward or downward when subjected to a severe impact. The outer bumper bar 19 is longer than the inner bar 20, and is bent, as indicated at $19^a$, to extend beyond the bend $20^a$ of the inner bumper bar, so as to protect the wheels and mud-guards of the automobile from damage. The bumper bars are secured together intermediate their extremities by a connection which permits relative movement of the spring bars 19, 20 when they are subjected to compression. This connection preferably consists of bolts 22, 22, carried by the outer bar 19, and extending through elongated slots 23, 23, formed in the inner bar 20.

The bumper bar supports 21, 21 are preferably, though not necessarily, made of cast metal, and are formed in each case with three integral arms 24, 25, 26. The arm 24 is preferably angular in cross-section and conforms in a general way with the inclination of the body bolster 11 of the automobile frame. The end of this arm is provided with perforated ears adapted to receive the U-bolts 27 and is clamped to the starting crank bearing 12. The top flange 28 of the support 21 extends diagonally across the body bolster 11 so as to clear the corner of the radiator frame 17 and the vertical flange 28 of the support bears firmly against the forward face of the body bolster, so as to transmit the thrusts on the bumper bars directly to the framing of the automobile. The arm 25 projects forwardly and provides suitable means for attaching the extremities of the bumper bars 19 and 20 to the said support, and is rigidified by means of a stiffening web 29. The arm 26 extends rearwardly and is attached to the lower end of the lamp post 15 between the mud-guard brackets 14 and the nut $15^a$, for securing the lamp posts in place. In order to facilitate convenient attachment of this arm, its outer end, instead of being formed with an ordinary bolt hole, is formed with an open slot 30 whereby the arm may be fitted between the mud-guard brackets 14 and the nut $15^a$ without requiring the nut $15^a$ to be entirely removed. An angular attaching member 31 is removably secured to the bumper bar supports between ribs 32, 32, and is formed at its outer end with an open slot 33 adapted to be fitted over the bolt 34, employed for clamping the frame 18 of the radiator frame to the side framing of the automobile. The attaching member 31 is preferably secured to the bumper bar supports by a bolt 35 and is positioned between the flange 18 of the radiator frame and the nut $18^a$.

A bumper constructed as above described may be readily applied so as to be rigidly supported by the framing of the automobile, and the mud-guard brackets, without requiring the removal of any part of the automobile framing or brackets attached thereto. The removable attaching member 31 presents a further advantage in that it can be disconnected and the radiator 17 removed from the frame of the automobile without necessitating a complete disconnection or removal of the bumper construction.

In some situations it is desirable to provide an additional attachment for securing the bumper bar supports to the mud-guard brackets of the automobile. To accommodate such conditions, I preferably provide an eye-bolt 36 adapted to fit over the lamp posts 15 at a point above the mud-guard 14. The shank of the eye-bolt extends through an aperture in an upstanding lug 37 formed on the arm 26, and is threaded for a nut 38. By tightening the nut 38 the vertical web 28 of the bumper bar support may be drawn tightly against the front face of the body bolster 11 of the automobile framing.

In Figs. 6 and 7 I have shown a modified form of bumper bar support in which the arm $24^a$, instead of extending over the upper surface of the body bolster $11^a$ and being secured to the starting crank bearing 12, as shown in the preceding figures, is somewhat shorter than the corresponding arm shown in Figs. 1 to 5, inclusive, and is formed with a flange $24^b$ which extends under the body bolster $11^a$ and is clamped to the under edges thereof by means of a U-bolt 40. This modification, like the structure shown in Figs. 1 to 4 inclusive, is formed with a vertically extending flange 28ª and is adapted to bear against the forward face of the body bolster 11ª in substantially the same manner and for the purpose described in connection with Figs. 1 to 4 inclusive. In other respects, the bumper construction shown in Figs. 6 and 7 may be made the same as that disclosed in Figs. 1 to 5 inclusive, which construction need not be again described in this connection.

While I have illustrated my invention in two specific embodiments, it will be obvious that further modifications in structure might be made without departure from my invention. I therefore do not wish to be limited to the exact structure shown and described, except in so far as specifically limited in the claims appended hereto.

Having described my invention, what I claim is:

1. An automobile bumper comprising two bumper bars secured together intermediate their extremities with capacity for relative movement and having their ends bent rearwardly to provide attaching arms, and means for securing said bumper bars to the automobile comprising two bumper bar supports, each of which is formed with an arm adapted to be bolted to the framing of an automobile, an arm to which the adjacent extremities of said bumper bars are rigidly attached, and an arm adapted to be attached to the mud guard bracket of the automobile.

2. In an automobile bumper, the combination with the body bolster and mud guard brackets of an automobile, of an impact member positioned at one end of the automobile, and means for securing said impact member to the automobile comprising supporting members secured to opposite ends of said impact member and formed, in each case with an arm having a flange which bears against the vertical face of said body bolster, means for attaching said arm to said body bolster, and means adapted to be detachably engaged with one of said mud guard brackets.

3. In an automobile bumper, the combination with the body bolster and mud guard brackets of an automobile of an impact member positioned at one end of the automobile, and means for securing said impact member to the automobile comprising supporting members secured to opposite ends of said impact member and formed, in each case with a vertically disposed face adapted to abut against the vertical face of said body bolster and be secured thereto, and an arm formed with a slot in its outer end adapted to be engaged with a portion of one of said mud guard brackets.

4. In an automobile bumper, the combination with the body bolster and mud guard brackets of an automobile, of an impact member positioned at the front end of the automobile, and means for securing said impact member to the automobile comprising supporting members secured to opposite ends of said impact member and formed, in each case, with an arm having a bearing surface adapted to bear against a relatively large area of the vertical face of said body bolster, an arm formed with a slot in its outer end adapted to fit over one of the lamp posts of the car and be clamped in a position below one of said mud guard brackets, and a clamping device engaged with said support and with said lamp posts at a point above said mud guard brackets.

5. In an automobile bumper, the combination with a transverse frame member, mud guard brackets and lamp posts of an automobile, of an impact member comprising two metal strips having their ends bent rearwardly and secured together at their ends and intermediate their ends, and means for securing said impact member to the automobile comprising rigid members formed in each case, with a forwardly extending arm adapted to be bolted to the adjacent extremities of said metal strips, an arm secured to said transverse frame member, and an arm formed at its outer end with a slot adapted to engage with one of said lamp posts; and detachable bolting means for clamping said rigid members in their operative position.

6. In an automobile bumper, the combination with a transverse frame member, radiator frames and means for securing said radiator to the framing of the automobile, of an impact member extending transversely of the automobile, and means for securing said impact member in its operative position comprising two rigid supporting brackets secured to the ends of said impact member and to the transverse frame member, and attaching members removably secured to each of said supporting brackets and formed at their outer ends with open slots adapted to engage the said means for securing said radiator in place; whereby the bumper may be attached to the automobile without requiring the removal of said radiator and the radiator subsequently removed therefrom without requiring the removal of said bumper.

7. In an automobile bumper, the combination with the transverse and longitudinal members of the frame, and mud guard brackets, and a radiator having flanges adapted to be bolted to the longitudinal frame members, of an impact member, and means for securing said impact member to the automobile comprising two angular supporting members, formed in each case with an arm adapted to be attached to the said transverse frame member and an integral arm for attachment to one of said mud guard brackets and an attaching member removably secured to the body portion of said supporting member and adapted to overlap the flanges of said radiator and be secured in its operative position by means of said radiator attaching bolts; said attaching member being formed with an open slot at its outer end whereby it may be readily connected with or disconnected from said radiator attaching bolt.

FRANK TOMASEK.